United States Patent
Wu et al.

(10) Patent No.: US 11,150,946 B2
(45) Date of Patent: Oct. 19, 2021

(54) METHOD AND SYSTEM FOR PROCESSING COMMUNICATION CHANNEL

(71) Applicant: ALIBABA GROUP HOLDING LIMITED, Grand Cayman (KY)

(72) Inventors: Yongjun Wu, Hangzhou (CN); Zhipeng Tang, Hangzhou (CN); Yangyu Tao, Hangzhou (CN); Chao Li, Hangzhou (CN); Yihui Feng, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 168 days.

(21) Appl. No.: 16/127,134

(22) Filed: Sep. 10, 2018

(65) Prior Publication Data

US 2018/0373563 A1 Dec. 27, 2018

Related U.S. Application Data

(63) Continuation of application No. PCT/CN2017/075576, filed on Mar. 3, 2017.

(30) Foreign Application Priority Data

Mar. 10, 2016 (CN) .......................... 201610136917.3

(51) Int. Cl.
*G06F 9/48* (2006.01)
*H04L 12/26* (2006.01)
(Continued)

(52) U.S. Cl.
CPC ........ *G06F 9/4887* (2013.01); *H04L 43/0811* (2013.01); *H04L 43/10* (2013.01); *H04L 67/145* (2013.01); *H04W 76/20* (2018.02)

(58) Field of Classification Search
CPC ..... G06F 9/4887; G06F 9/547; H04L 67/145; H04L 43/0811; H04L 43/10; H04L 67/143; H04W 76/20; H04W 76/38
See application file for complete search history.

(56) References Cited

U.S. PATENT DOCUMENTS

| | | | |
|---|---|---|---|
| 2003/0041263 A1* | 2/2003 | Devine | G06F 11/0709 726/4 |
| 2009/0067407 A1* | 3/2009 | Jia | H04L 12/189 370/350 |

(Continued)

FOREIGN PATENT DOCUMENTS

| | | |
|---|---|---|
| CN | 102231126 A | 11/2011 |
| CN | 102739391 A | 10/2012 |

(Continued)

OTHER PUBLICATIONS

PCT International Search Report and Written Opinion dated May 24, 2017, issued in corresponding International Application No. PCT/CN2017/075576 (16 pgs.).

*Primary Examiner* — Soe Hlaing
(74) *Attorney, Agent, or Firm* — Finnegan, Henderson, Farabow, Garrett & Dunner, LLP

(57) ABSTRACT

There is provided a method and a system for processing a communication channel. Including a heartbeat channel and a data channel between a master process and a worker process. The method includes determining at least one data channel associated with a heartbeat channel, detecting the determined at least one data channel, disconnecting the heartbeat channel when it is detected that any data channel is in a disconnected state to cause a heartbeat to time out, and ending a current task after it is determined that the heartbeat times out.

19 Claims, 9 Drawing Sheets

(51) Int. Cl.
*H04W 76/20* (2018.01)
*H04L 29/08* (2006.01)

(56) References Cited

U.S. PATENT DOCUMENTS

| | | | |
|---|---|---|---|
| 2010/0220728 A1* | 9/2010 | Williams | H04L 1/0041 370/394 |
| 2012/0042030 A1* | 2/2012 | Deshmukh | G06F 11/0709 709/208 |
| 2013/0151714 A1 | 6/2013 | Ralph et al. | |

FOREIGN PATENT DOCUMENTS

| | | |
|---|---|---|
| CN | 103036904 A | 4/2013 |
| CN | 104936269 A | 9/2015 |
| WO | WO 2017/152807 A1 | 9/2017 |

\* cited by examiner

METHOD AND SYSTEM FOR PROCESSING COMMUNICATION CHANNEL

CROSS-REFERENCE TO RELATED APPLICATION

This application is a continuation of International Application No. PCT/CN2017/075576, filed on Mar. 3, 2017, which claims priority to and the benefits of Chinese Patent Application No. 2016/10136917.3, filed on Mar. 10, 2016, both of which are incorporated herein by reference in their entireties.

TECHNICAL FIELD

The present disclosure relates to the field of communication technologies, and in particular, to a method processing a communication channel and a system for processing a communication channel.

BACKGROUND

Programs usually run on different nodes in a distributed system. There are generally two types of communications between programs. One is heartbeat communications, in which states of both communication parties are synchronized through periodic heartbeat signals. The other is data communications, in which sent content is data related to user logic, for example, executed task instructions and results of instruction execution. A network link of the heartbeat communication is referred to as a heartbeat channel. A network link of the data communication is referred to as a data channel.

During the actual operation and maintenance of a product, especially when a cluster network is heavily loaded, it is possible that some or all data channels do not work but the heartbeat channels are still connected. When a system is in this state, a command sent by a master process to a worker process cannot be executed, or the worker process cannot inform the master process of a task execution result. As the master process considers that the worker process still operates normally, a task executed at the side of the master process cannot be finished for a long time. The task is suspended, which seriously affects the normal operation of the system.

SUMMARY

In view of the foregoing problem, embodiments of the present disclosure are proposed to provide a method and a system for processing a communication channel that address the foregoing problem or at least partially solve the foregoing problem.

In accordance with some embodiments of the present disclosure, there is provided a method for processing a communication channel including a heartbeat channel and at least one data channel between a master process and a worker process. The method includes determining at least one data channel associated with a heartbeat channel. The method also include detecting the determined at least one data channel. The method further includes disconnecting the heartbeat channel in response to a detection that any data channel is in a disconnected state to cause a heartbeat to time out. Additionally, the method includes ending a current task in response to a determination that the heartbeat times out.

In accordance with some embodiments of the present disclosure, there is provided a system for processing a communication channel including a heartbeat channel and a data channel between a master process and a worker process. The system includes one or more memories configured to store instructions and one or more processors configured to execute the instructions to cause the system to: determine at least one data channel associated with a heartbeat channel; detect the determined at least one data channel; disconnect the heartbeat channel in response to a detection that any data channel is in a disconnected state to cause a heartbeat to time out; and end a current task in response to a determination that the heartbeat times out.

In accordance with some embodiments of the present disclosure, there is provided a non-transitory computer-readable storage medium storing a set of instructions that is executable by one or more processors of one or more electronic devices to cause the one or more electronic devices to perform a method for processing a communication channel comprising a heartbeat channel and at least one data channel between a master process and a worker process. The method includes determining at least one data channel associated with a heartbeat channel. The method also includes detecting the determined at least one data channel. The method further includes providing instructions to disconnect the heartbeat channel in response to a detection that any data channel is in a disconnected state to cause a heartbeat to time out. Additionally, the method includes providing instructions to end a current task in response to a determination that the heartbeat times out.

Embodiments of the present disclosure may include the following advantages. The communication channel processing scheme described herein can determine at least one data channel associated with a heartbeat channel, detect the determined at least one data channel associated with the heartbeat channel, disconnect the heartbeat channel when it is detected that any data channel is in a disconnected state to cause a heartbeat to time out, and end a current task after it is determined that the heartbeat times out. It can be seen that in the embodiments of the present disclosure, a heartbeat channel and a data channel are associated, so that when the data channel does not work, the heartbeat channel is disconnected, ensuring state consistency of the two channels. That is, when the data channel is abnormal, the communication channel is also disconnected, so that both the data channel and the communication channel are in an abnormal state. As such, a current task can be timely ended, avoiding the problem that the current task cannot be executed in a long time and reducing the occupation of system resources.

DETAILED DESCRIPTION

To make the foregoing objectives, features, and advantages of the present disclosure more comprehensible, the present disclosure is described below in further detail with reference to the accompanying drawings and specific implementations.

Programs usually run on different nodes in a distributed system. There are generally two types of communications between processes or programs. One is heartbeat communications, in which states of both communication parties are synchronized through periodic heartbeat signals. The other is data communications, in which sent content is data related to user logic, for example, executed task instructions and results of instruction execution. A network link of the heartbeat communication can be referred to as a heartbeat channel. A network link of the data communication can be referred to as a data channel. In these embodiments, the communication channel includes, but is not limited to, a heartbeat channel and a data channel between a master process and a worker process.

Figure 1:
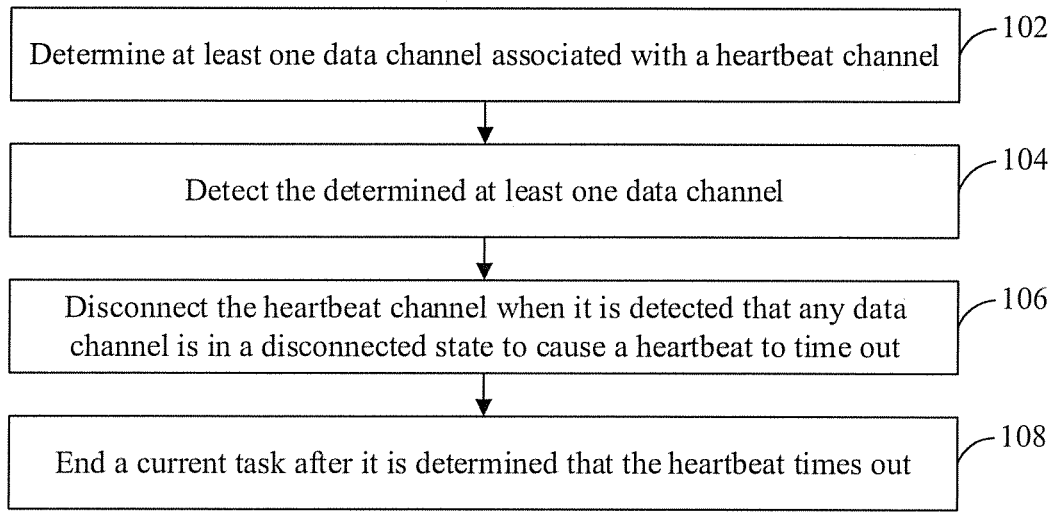
FIG. 1 is a flowchart of an exemplary method for processing a communication channel according to some embodiments of the present disclosure.

Referring to FIG. 1, a flowchart of steps of a method for processing a communication channel according to some embodiments of the present disclosure is shown. In these embodiments, the method for processing a communication channel includes steps 102-108.

In step 102, at least one data channel associated with a heartbeat channel is determined. As described above, a heartbeat channel and a data channel can be included between a master process and a worker process. Generally, there can be one heartbeat channel and multiple data channels. In these embodiments, the heartbeat channel may not be completely associated with some data channels, and the specific association can be configured according to actual requirements. For example, it can be configured according to functions and/or degrees of importance of the data channels that some data channels are associated with the heartbeat channel and some other data channels are independent of the heartbeat channel. This avoids influences of unnecessary data channels on the heartbeat channel while ensuring an association between necessary data channels and the heartbeat channel, and reduces the occupation of resources. It is noted that the at least one data channel associated with the heartbeat channel can be logically associated with the heartbeat channel, while network links of the channels are independent of each other.

In step 104, the determined at least one data channel is detected. In these embodiments, the determined at least one data channel can be determined in any appropriate manner. The detection can include detecting whether the network link of each data channel associated with the heartbeat channel is available. It can be detected whether the network link of each data channel is available in a manner of, for example, but not limited to, sending a detection message periodically in the data channel.

In step 106, the heartbeat channel is disconnected when it is detected that any data channel is in a disconnected state to cause a heartbeat to time out. In these embodiments, the heartbeat channel can be disconnected in any appropriate manner when it is detected that any data channel is in a disconnected state to cause a heartbeat to time out. For example, disconnection of the heartbeat channel can be triggered in a manner of sending a notification message. Alternatively, disconnection of the heartbeat channel can be controlled directly. These examples are not limiting in the disclosure.

In step 108, a current task is ended after it is determined that the heartbeat times out. As described above, the problem that the network link of the data channel does not work (is disconnected) while the heartbeat channel is still available usually occurs in an actual application. When the system is in such a state that the data channel is disconnected and the heartbeat channel is available, the disconnection of the data channel will result in a problem that a command sent by a sending end (e.g., a master process) to a receiving end (e.g., a worker process) cannot be executed. Additionally or alternatively, the receiving end cannot send a task execution result to the sending end. However, as the heartbeat channel is available, a heartbeat signal can still be sent and transmitted normally. The sending end always considers that the receiving end is in a normal running state. As a result, an executed task of the sending end is shelved for a long time and cannot be ended so that the task is hung all the time.

In these embodiments, after the heartbeat channel is disconnected, the heartbeat signal cannot be continually sent to get transmitted normally through the heartbeat channel, and the heartbeat times out. The receiving end and the sending end cannot stay synchronized with each other. Both the sending end and the receiving end will consider that the other party is in an abnormal state. When the sending end and the receiving end are in an abnormal state, the current task can be ended normally and/or re-scheduled, avoiding the problem that the current task is shelved for a long time and cannot be completed all the time. In summary, the method for processing a communication channel in these embodiments can first determine at least one data channel associated with a heartbeat channel. The method can then detect the determined at least one data channel associated with the heartbeat channel. The method can disconnect the heartbeat channel when it is detected that any data channel is in a disconnected state, so that a heartbeat is caused to time out. The method can end a current task after it is determined that the heartbeat times out. It can be seen that in these embodiments, a heartbeat channel and a data channel are associated, so that when the data channel does not work, the heartbeat channel is disconnected accordingly. This can ensure state consistency of the two channels. That is, when the data channel is abnormal, the communication channel is disconnected, so that both the data channel and the communication channel are in an abnormal state. Thus, a current task can be timely ended, avoiding the problem that the current task is shelved for a long time and constantly fails to be executed and reducing the occupation of system resources.

A master-worker mode is one of the common parallel modes in a distributed system. The core idea of the master-worker mode is that a master process and a worker process in the system cooperate with each other. The master process is responsible for receiving and assigning tasks, and the worker process is responsible for processing the tasks. After finishing processing the tasks, the worker process can return task processing results to the master process, and the master process can summarize the processing results returned by the worker process. The communication channel between the master process and the worker process can include a heartbeat channel and a data channel.

Figure 2:
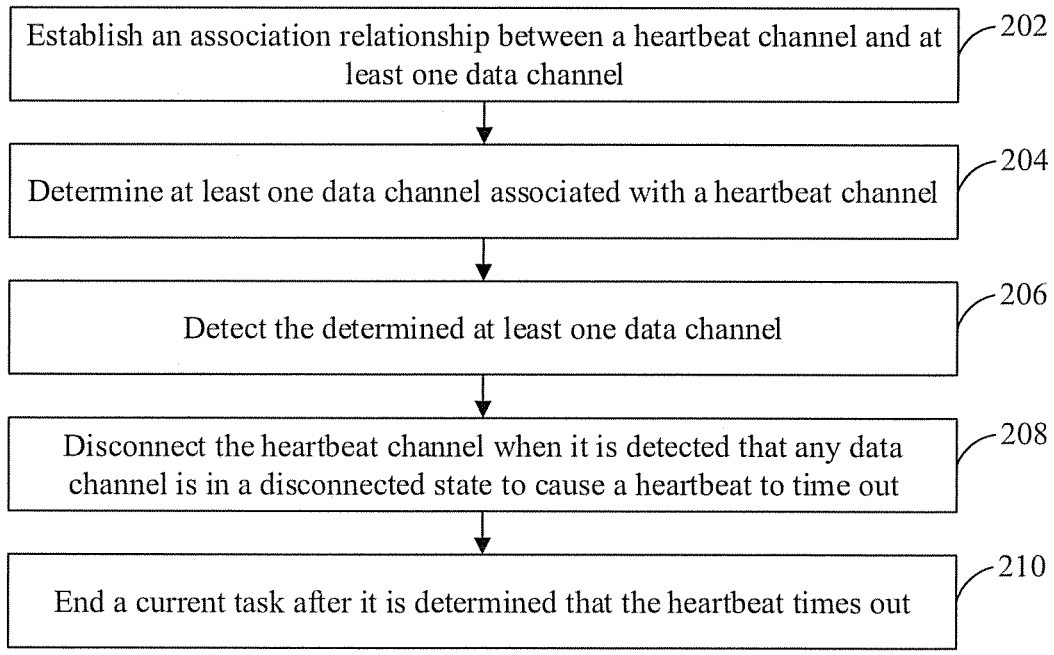
FIG. 2 is a flowchart of an exemplary method for processing a communication channel according to some embodiments of the present disclosure.

Referring to FIG. 2, a flowchart of steps of a method for processing a communication channel according to some embodiments of the present disclosure is shown. In these embodiments, the method for processing a communication channel includes steps 202-210:

In step 202, an association relationship between a heartbeat channel and at least one data channel is established. In these embodiments, an association relationship between a heartbeat channel and a data channel can be established according to an actual situation. For example, the at least one data channel can be associated with the same heartbeat channel to improve the scalability of the system. It is noted that the heartbeat channel and the at least one data channel may only have an association relationship, and the channels are still independent of each other.

A feasible manner of establishing an association relationship between the heartbeat channel and the at least one data channel can be as follows. It is determined whether a current data channel carries a set identifier. Address information of the heartbeat channel is sent to the current data channel if the current data channel carries the set identifier to establish an association relationship between the current data channel and the heartbeat channel according to the address information. In other words, if the current data channel carries the set identifier, it indicates that the current data channel is associated with the heartbeat channel. If the current data channel does not work, it is considered that the network does not work, and the heartbeat is caused to time out, so that the heartbeat channel is also disconnected. If a data channel not carrying the set identifier (e.g., a data channel not associated with the heartbeat channel) does not work, the state of the heartbeat channel is not affected. In an actual application, the set identifier can be configured according to a degree of importance of the data channel during communication or according to a service requirement. For example, the set identifier is configured in a data channel with a relatively high degree of importance. Alternatively, the set identifier is configured in a data channel used frequently.

It is noted that the communication channel can conduct communications based on any appropriate protocol. For example, the heartbeat channel between the master process and the worker process can implement communication based on a UDP protocol. A first heartbeat message reported by the worker process to the master process through the heartbeat channel includes a UDP heartbeat address of the worker process. The UDP heartbeat address can be used to cause the master process to send a second heartbeat message to the worker process according to the UDP heartbeat address. A specific implementation can be as follows. On the worker process side, after startup, the worker process can dynamically monitor a local UDP port and establish a network connection to the master process to report a first heartbeat message. Each heartbeat message reported by the worker process includes a UDP heartbeat address of the worker process determined by monitoring. On the master process side, the master process receives a first heartbeat message reported by the worker process, acquires a UDP heartbeat address of the worker process carried in the first heartbeat message, and sends a second heartbeat message to the worker process according to the acquired UDP heartbeat address of the worker process. Thus, a heartbeat communication between the master process and the worker process can be implemented. It can be seen that in these embodiments, a simple UDP protocol is used to bear heartbeat communication, so that a heartbeat protocol is very simple. This can minimize both the network load caused by the communication and the processing logic of sending and receiving sides, and can be adapted to large-scale concurrent distributed applications.

In step 204, at least one data channel associated with a heartbeat channel is determined. In these embodiments, at least one data channel associated with a heartbeat channel can be determined according to the association relationship between the data channel and the heartbeat channel pre-established in step 202.

In step 206, the determined at least one data channel is detected. In these embodiments, a feasible manner of detecting a state of the data channel can include determining, according to a set detection message, whether the data channel is in a disconnected state. The set detection message is an empty data communication packet.

Specifically, the set detection message is sent periodically in the data channel when it is detected that a data message in the data channel fails to be sent. It is determined that the data channel is in the disconnected state if the set detection message continually fails to be sent in a first set time threshold. Otherwise, it is determined that the data channel is in a connected state.

In these embodiments, a state machine corresponding to the data channel can be set from a connected state to an uncertain state when it is detected that the data message in the data channel fails to be sent. The state machine corresponding to the data channel can be set from the uncertain state to a disconnected state when the set detection message continually fails to be sent.

It is noted that the data message in the data channel and the set detection message can be distributed and transmitted through different processes. Thus, influences of the set detection message on the master process and/or the worker process are reduced.

In step 208, the heartbeat channel is disconnected when it is detected that any data channel is in a disconnected state to cause a heartbeat to time out. In these embodiments, a state of the worker process can be updated to be a timeout state when it is detected that any data channel is in a disconnected state. The worker process is controlled to stop sending a heartbeat message to the master process, so that the master process updates a state of the worker process stored in the master process to be a timeout state.

The master process can be controlled to stop sending a heartbeat message to the worker process when it is detected that any data channel is in a disconnected state, so that a state of the worker process is updated to be a timeout state.

In step 210, a current task is ended after it is determined that the heartbeat times out. In these embodiments, a heartbeat timeout can include the following two situations.

For the master process, if the master process does not receive, within a first preset time, a heartbeat message sent through the heartbeat channel, it is determined that the heartbeat times out, and the current task is re-scheduled through the master process.

For the worker process, if the worker process does not receive, within a second preset time, a heartbeat message sent through the heartbeat channel, it is determined that the heartbeat times out, and the worker process is exited to end the current task executed in the worker process.

It can be seen that the method for processing a communication channel described in these embodiments implements a state association between a heartbeat channel and a data channel, so that when the data channel does not work, the heartbeat channel can be disconnected accordingly. This can ensure state consistency of the two channels. That is, when the data channel is abnormal, the communication channel is disconnected, so that both the data channel and the communication channel are in an abnormal state. Thus, a current task can be ended timely, avoiding the problem that the current task is shelved for a long time and constantly fails to be executed and reducing the occupation of system resources.

Secondly, network links between the heartbeat channel and the data channel are still independent of each other. The heartbeat channel can implement communication based on a simple UDP protocol, and the protocol is very simple. Both the network load caused by the communication and the processing logic of the sending and receiving sides are minimized. Thus, the method for processing a communication channel described in these embodiments can be adapted to large-scale concurrent distributed applications. In addition, the method for processing a communication channel described in these embodiments allows associating multiple data channels with the same heartbeat channel, further improving the scalability of the system.

In combination with the foregoing embodiments, the method for processing a communication channel is described in detail through a specific example in the embodiments below.

Figure 3:
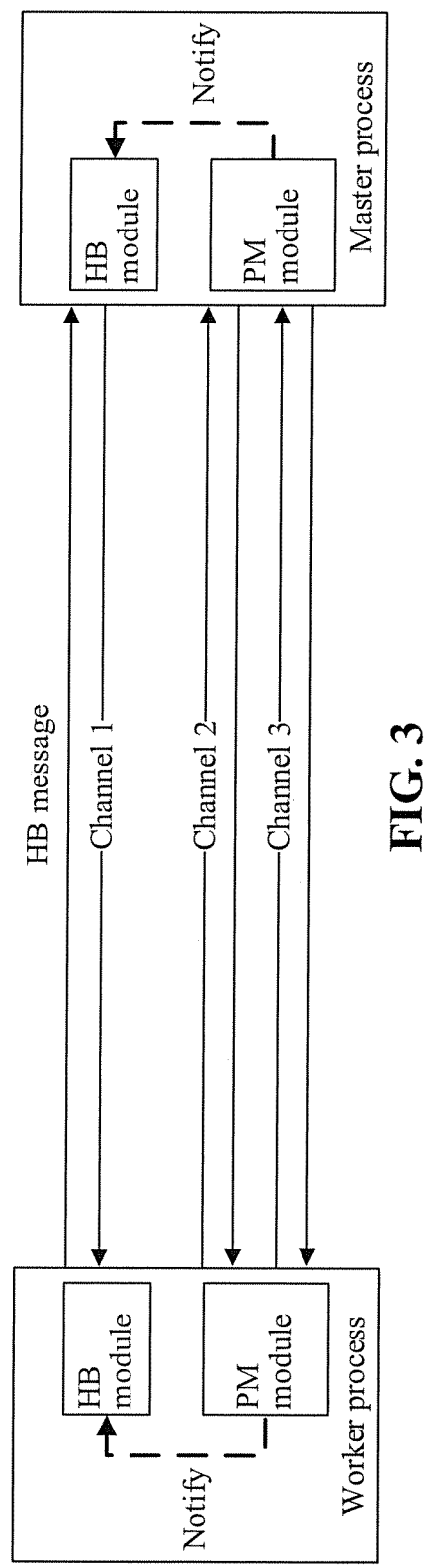
FIG. 3 is a diagram of an exemplary communication architecture of a master process and a worker process according to some embodiments of the present disclosure.

Referring to FIG. 3, a communication architecture diagram of a master process and a worker process according to some embodiments of the present disclosure is shown.

In these embodiments, a worker process end and a master process end in a distributed system each include a heartbeat channel module (HB module) and a data channel module (PM module).

The HB module is configured to maintain a heartbeat channel, for example, a channel 1 in FIG. 3. The channel 1 is used to transmit a heartbeat message (HB message). The PM module is configured to establish and maintain data channels, for example, a channel 2 and a channel 3 in FIG. 3. The channel 2 and the channel 3 are used to receive and send a data message (PB message).

In these embodiments, between two communication parties (the worker process end and the master process end), one heartbeat channel can be maintained through the HB module and multiple data channels can be maintained through the PM module. Further, in the present disclosure, an association relationship between a heartbeat channel and at least one data channel can be established.

Specifically, it can be determined whether a current data channel carries a set identifier. Address information of the heartbeat channel is sent to the current data channel if the current data channel carries the set identifier. Then, an association relationship between the current data channel and the heartbeat channel is established according to the address information. For example, when the current data channel does not work, a heartbeat channel can be determined according to address information that is carried in the current data channel and used for indicating the heartbeat channel associated with the current data channel. Then, a message indicating that the current data channel does not work is sent to the determined heartbeat channel. Thus, information interaction and sharing can be realized. Message interaction and sharing between the current data channel (PM module) and the heartbeat channel (HB module) can be implemented by, but not limited to, invoking a Notify( ) method.

Specifically, communication architectures of the master process and the worker process can be described through the following several aspects.

In some embodiments, a heartbeat mechanism has two functions. The first function is to let the one party know a state of the other party (whether it is LIVE). The second function is that the master process stops heartbeat to cause the worker process time out, which can be referred to as "wait to die."

The second function of the heartbeat mechanism is described in the following with reference to FIG. 4.

Figure 4:
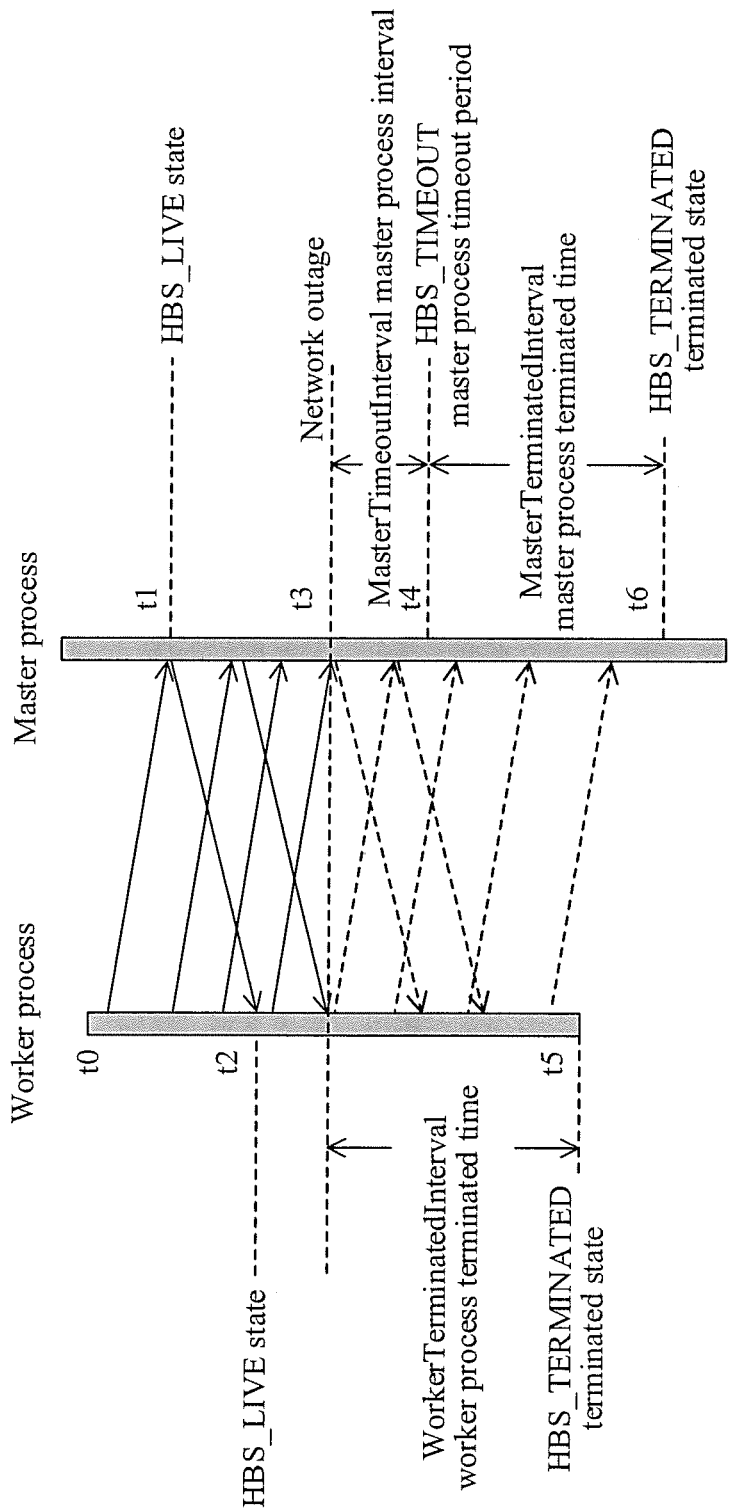
FIG. 4 is a diagram of an exemplary heartbeat mechanism according to some embodiments of the present disclosure.

Referring to FIG. 4, a principle diagram of a heartbeat mechanism according to some embodiments of the present disclosure is shown.

As shown in FIG. 4, the worker process starts at moment t0. At the moment t1, the master process receives the first heartbeat of the worker process, sets the state of the worker process in the master process to an HBS LIVE state (active state, that is, first state), and begins to send a heartbeat message to the worker process (represented with solid lines). At moment t2, the worker process receives the heartbeat of the master process for the first time, and enters the HBS LIVE state (first state). At moment t3, the network is disconnected, and then the master process and the worker process may still send heartbeat messages to each other, but the master process and the worker process cannot receive the heartbeat messages sent by each other (represented with dotted lines). If the worker process still does not receive a heartbeat message after a WorkerTerminatedInterval time (worker process terminated time, e.g., second preset time), the worker process enters an HBS_TERMINATED state (terminated state, e.g., second state) at moment t5. At this point, the worker process can end and exit. After the MasterTimeoutInterval (master process timeout time), e.g., at moment t4, the master process sets the worker process to an HBS_TIMEOUT state (timeout state) in the master process. Starting from moment t4, the master process no longer sends any heartbeat message to the worker process, and after a MasterTerminatedInterval time (master process terminated time, e.g., first preset time), the state of the worker process in the master process is set to an HBS_TERMINATED state (terminated state, e.g., second state) at moment t6. When the MasterTerminatedInterval time (first preset time) and the WorkerTerminatedInterval time (second preset time) are set, it can be configured that the first preset time is equal to the second preset time plus an interval between sending heartbeat messages (HBLoopInterval) This can ensure that the worker process has entered the HBS_TIMEOUT state when the state of the worker process in the master process is HBS_TERMINATED. After this stage, the master process can determine that the worker process has timed out, and thus a corresponding cleanup action can be performed.

As shown in FIG. 3, one or more data channels are established between the master process and the worker process through a PM module. In some embodiments, a set detection message (e.g., a PING message) can be added to each established data channel to implement detection on the data channels. For example, connectivity of the data channel can be detected through the PING message and fed back to a state machine of the data channel to determine whether the data channel is in a connected state.

Figure 5:
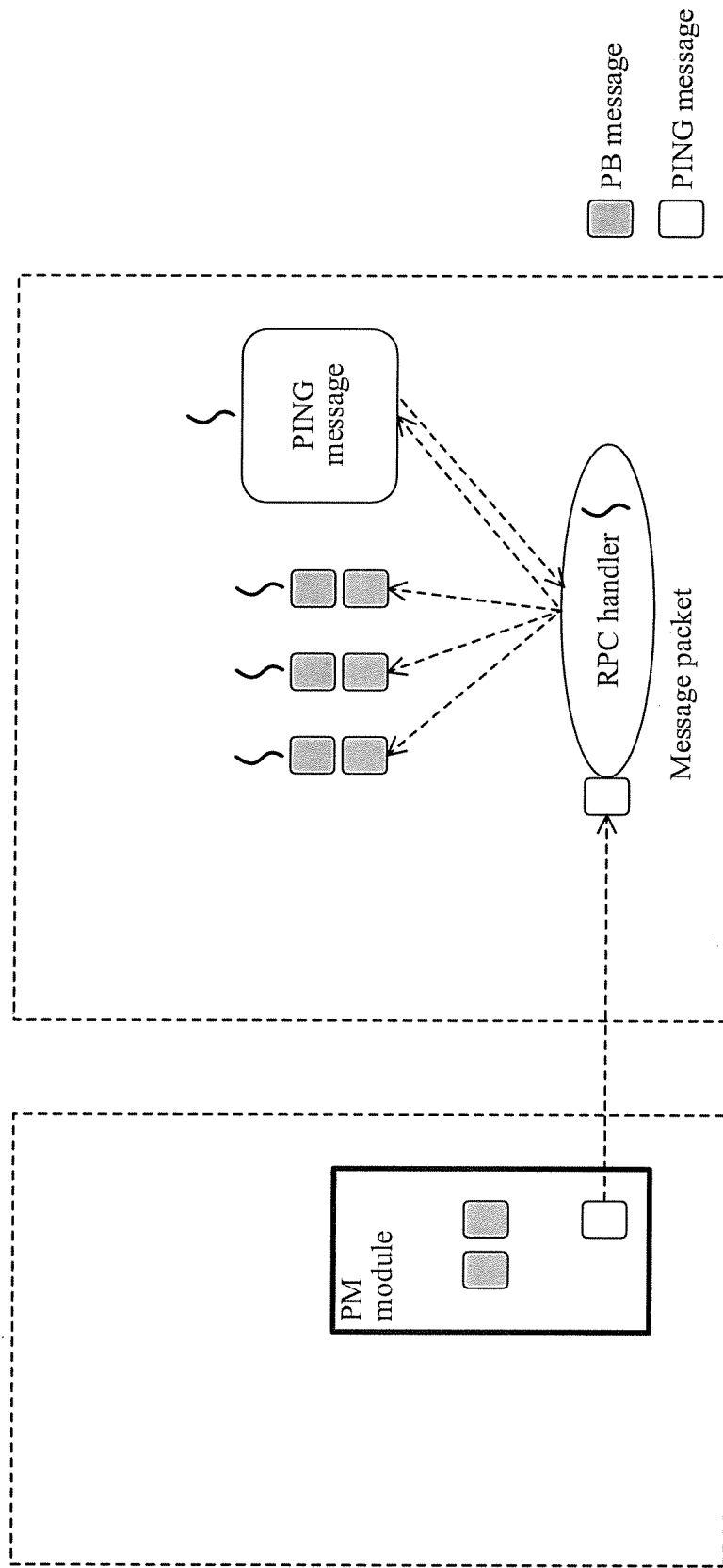
FIG. 5 is an exemplary flowchart depicting sending and processing of a set detection message according to some embodiments of the present disclosure.

Referring to FIG. 5, exemplary data communications of sending and processing of a set detection message according to some embodiments of the present disclosure is shown. In these embodiments, when the sending of a data message (PB message) to the other party by a PM module fails, the PM module sends an empty packet, e.g., a PING message, periodically through the same network link. For example, the PM module can package a PING message and send the PING message in the form of a message packet to a Remote Procedure Call Protocol (RPC) handler. The PB message and the PING message can be received at the same port, but their processing threads may be separate, thus reducing influences of the PING message on the receiving end.

Figure 6:
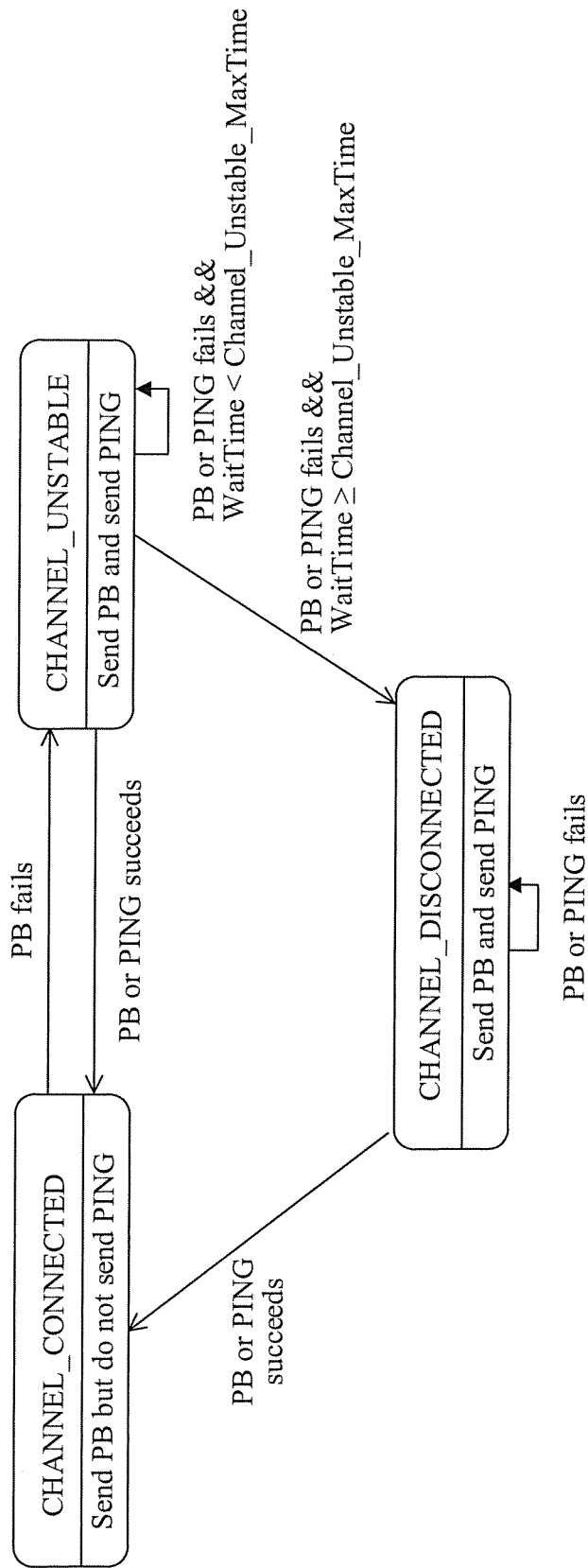
FIG. 6 is an exemplary diagram depicting conversion of a data channel state machine according to some embodiments of the present disclosure.

Further, referring to FIG. 6, a schematic diagram of conversion of a data channel state machine according to some embodiments of the present disclosure is shown. In these embodiments, when the network is normal and the state of the data channel is a CHANNEL_CONNECTED state, PB messages are sent and no PING messages are sent. When a first PB message fails to be sent, the state machine switches to a CHANNEL_UNSTABLE state, sends PB messages, and sends PING messages periodically. In the CHANNEL_UNSTABLE state, if the PB messages or the PING messages are sent successfully, the state machine switches back to the CHANNEL_CONNECTED state. If the PB messages or the PING messages fail to be sent and WaitTime≥Channel_Unstable_MaxTime (the maximum time of channel instability), the state machine switches to a CHANNEL_DISCONNECTED state, sends PB messages, and sends PING messages periodically. In other words, if the PB messages or the PING messages continually fail to be successfully sent and the duration is greater than or equal to a Channel_Unstable_MaxDuration time, the state machine switches to the CHANNEL_DISCONNECTED state (i.e., a state in which the data channel is disconnected). The Wait-Time refers to a duration in which the PB messages or the PING messages continually fail to be sent.

Regarding the heartbeat channel and the data channel, the heartbeat is simpler than user data in terms of both the communication protocol and the processing logic. Therefore, if the heartbeat channel does not work, networks of the both parties are also unavailable. Only the problem that the heartbeat channel works while the data channel does not work may occur during actual application of a distributed system. For the heartbeat channel to reflect network states of the both parties more authentically, the state of the data channel can be associated with the heartbeat channel. That is, when the data channel does not work, the heartbeat channel is also disconnected.

Figure 7:
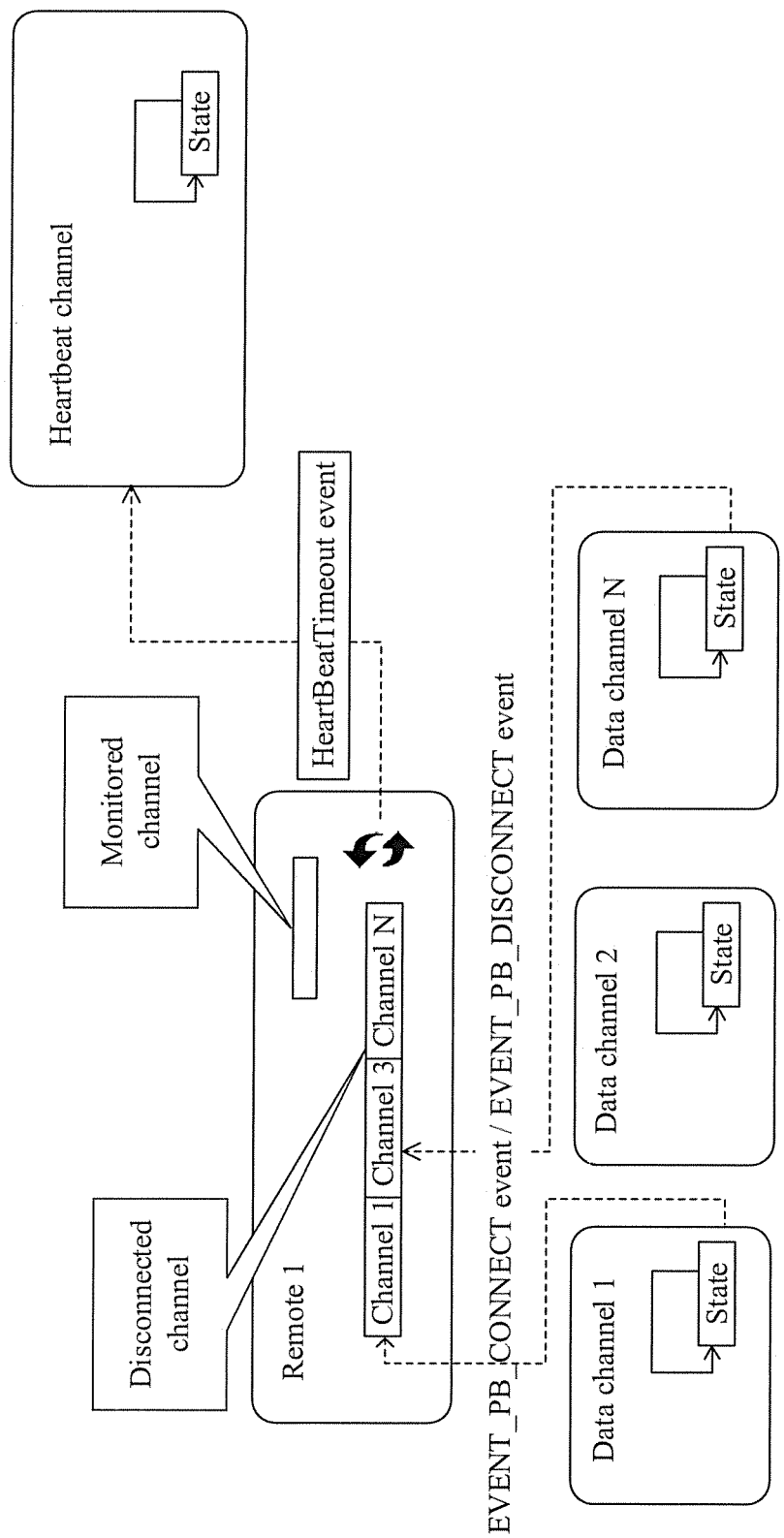
FIG. 7 is a diagram of an exemplary association module according to some embodiments of the present disclosure.

Referring to FIG. 7, a schematic diagram of an association module according to some embodiments of the present disclosure is shown. In these embodiments, a relationship between data channels and heartbeat channels may be N:1, where N≥1. States of N data channels can be taken as a whole. It can be considered that the network is unavailable if one of the data channels does not work, and the heartbeat is caused to time out by triggering a Timeout event of a HeartBeat module, so that the heartbeat channel is disconnected. As shown in FIG. 7, channel states of a data channel 1, a data channel 2, and a data channel N can be summarized in Remote1, and Remote1 is monitored. For example, a channel state such as EVENT_PB_CONNECT may indicate that the PB data channel is connected, and a channel state such as EVENT_PB_DISCONNECT may indicate that the PB data channel is disconnected. If any data channel does not work, the heartbeat can be controlled to time out (HeartBeatTimeout), so that the heartbeat channel is disconnected.

Figure 8:
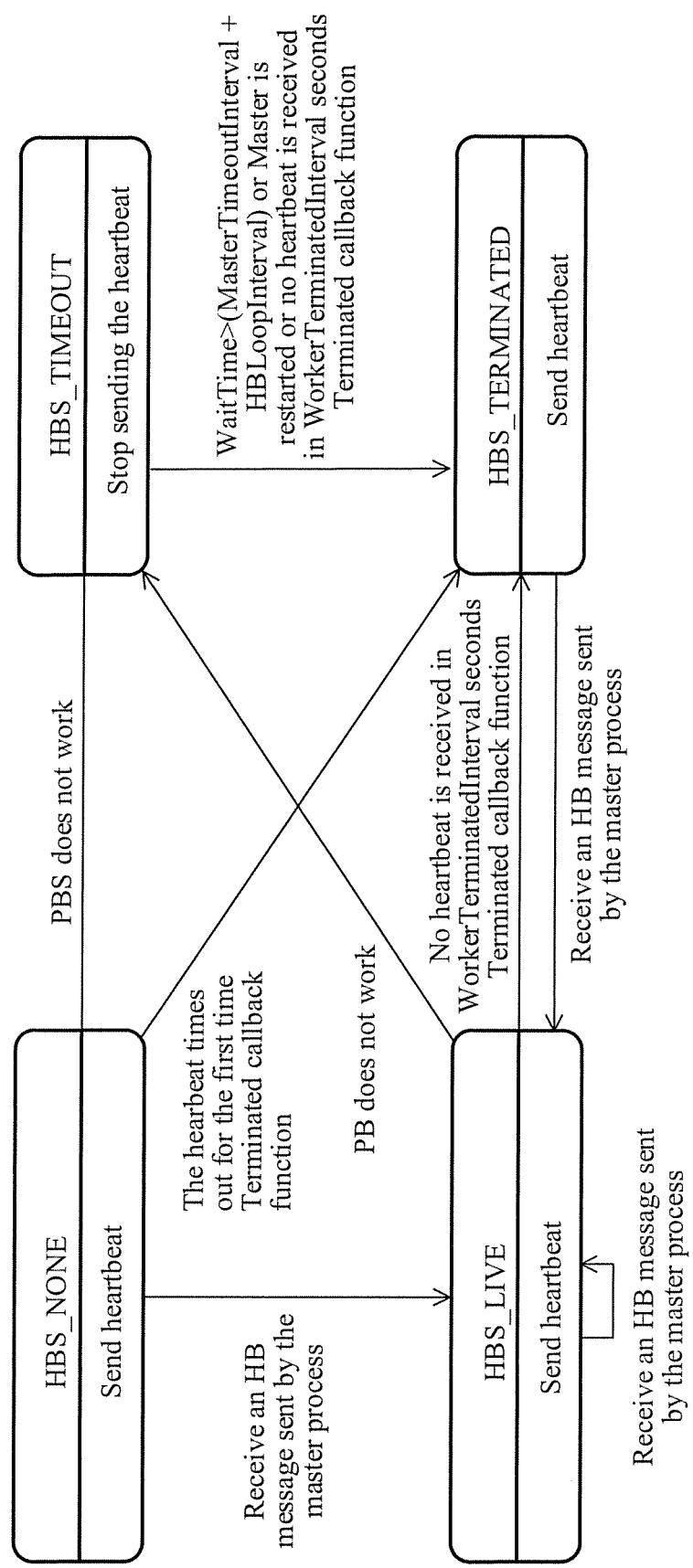
FIG. 8 is an exemplary diagram depicting conversion of a heartbeat state machine of a worker process according to some embodiments of the present disclosure.

Referring to FIG. 8, a schematic diagram of conversion of a heartbeat state machine of a worker process according to some embodiments of the present disclosure is shown. In these embodiments, when a data channel does not work (the PB does not work), the worker process enters an HBS_TIMEOUT state (timeout state). In the timeout state, the worker process stops sending a heartbeat message to the master process, so that the master process sets the state of the worker process retained in the master process to a timeout state when not receiving the heartbeat message sent by the worker process, and re-schedules a task. The WorkerTerminatedInterval time, the MasterTimeoutInterval time (master timeout time) and the HBLoopInterval can be configured according to an actual cluster environment requirement, which is not limited by the disclosure.

Figure 9:
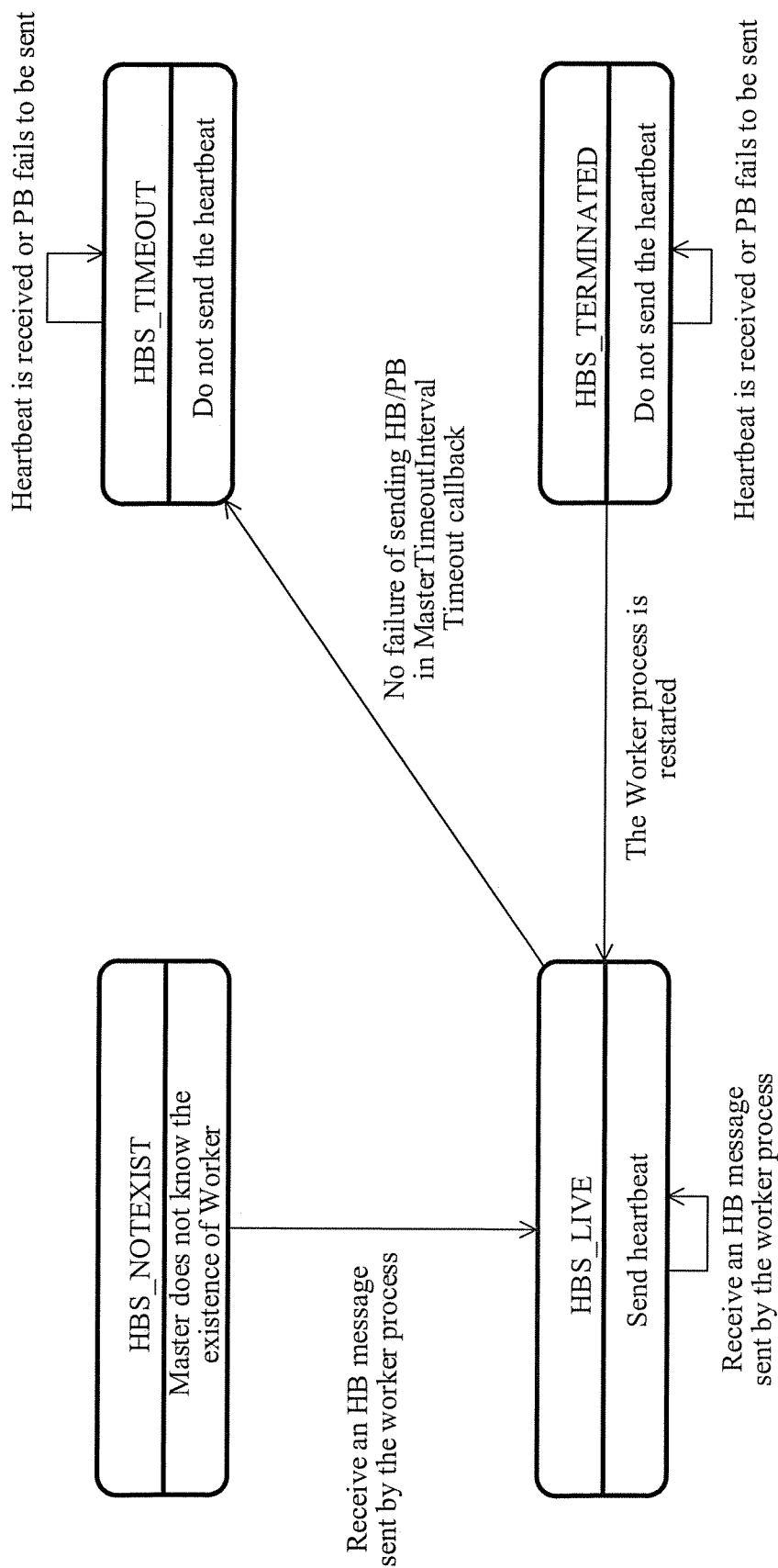
FIG. 9 is an exemplary diagram depicting conversion of a heartbeat state machine of a master process according to some embodiments of the present disclosure.

Referring to FIG. 9, a schematic diagram of conversion of a heartbeat state machine of a master process according to some embodiments of the present disclosure is shown. In these embodiments, there is no change to the states of the master process, but an additional triggering condition is provided: a data channel disconnected (PB disconnected) event. When the PB is disconnected, the master process can set the state of the corresponding worker process to HBS_TIMEOUT. The master process can stop sending the heartbeat message, so that the worker process also enters the HBS_TIMEOUT state.

It can be seen that in these embodiments, a heartbeat channel and a data channel are associated, so that when the data channel does not work, the heartbeat channel is disconnected accordingly to ensure state consistency of the two channels. That is, when the data channel is abnormal, the communication channel is disconnected. Then, a task can be reconfigured to re-start the task. Thus, the problem that the current task is shelved for a long time such that it cannot be executed while still occupying system resources can be avoided.

Secondly, the heartbeat channel and the data channel are independent of each other. The heartbeat channel uses a simple UDP protocol to bear heartbeat communication so that the protocol for a heartbeat can be quite simple. This minimizes both the network load caused by the communication and the processing logic of sending and receiving sides, and can be adapted to large-scale concurrent distributed applications. In addition, in these embodiments, multiple data channels are allowed to be associated with the same heartbeat channel. Thus, the scalability of the system can be improved.

Figure 10:
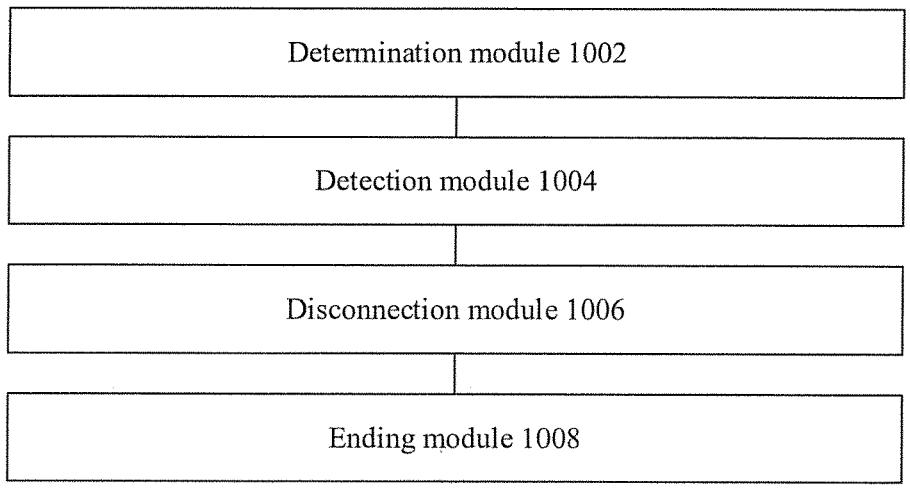
FIG. 10 is a block diagram of an exemplary system for processing a communication channel according to some embodiments of the present disclosure.

Based on the foregoing embodiments, embodiments below further provide a system for processing a communication channel. The communication channel includes a heartbeat channel and a data channel between a master process and a worker process. Referring to FIG. 10, a structural block diagram of a system for processing a communication channel according to some embodiments of the present disclosure is shown. In these embodiments, the system for processing a communication channel can include a determination module 1002 configured to determine at least one data channel associated with a heartbeat channel and a detection module 1004 configured to detect the determined at least one data channel. The system can also include a disconnection module 1006 configured to disconnect the heartbeat channel when it is detected that any data channel is in a disconnected state to cause a heartbeat to time out. The system can further include an ending module 1008 configured to end a current task after it is determined that the heartbeat times out.

It can be seen that the system for processing a communication channel described in these embodiments implements a state association between a heartbeat channel and a data channel, so that when the data channel does not work, the heartbeat channel is disconnected accordingly, ensuring state consistency of the two channels. That is, when the data channel is abnormal, the communication channel is disconnected, so that both the data channel and the communication channel are in an abnormal state. Thus, a current task can be ended timely, avoiding the problem that the current task is shelved for a long time and constantly fails to be executed and reducing the occupation of system resources.

Figure 11:
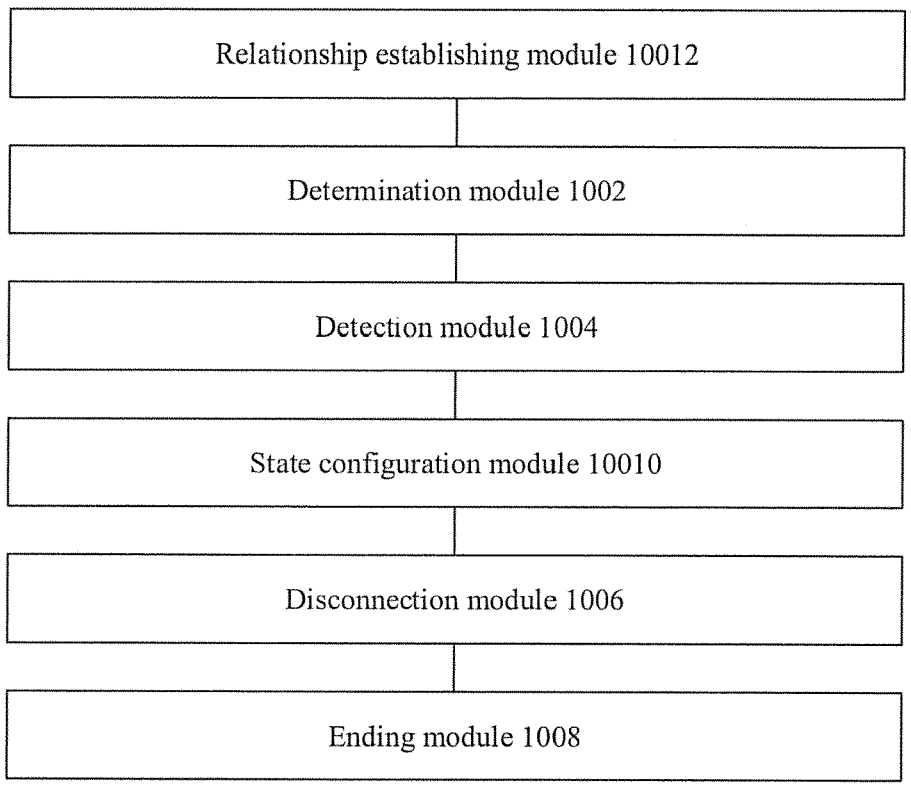
FIG. 11 is a block diagram of an exemplary system for processing a communication channel according to some embodiments of the present disclosure.

Referring to FIG. 11, a structural block diagram of an exemplary system for processing a communication channel according to some embodiments of the present disclosure is shown.

In these embodiments, the system can further include a state configuration module 10010 configured to set a state machine corresponding to the data channel from a connected state to an uncertain state when it is detected that the data message in the data channel fails to be sent and to set the state machine corresponding to the data channel from the uncertain state to a disconnected state when the set detection message continually fails to be sent.

The system can further include a relationship establishing module 10012 configured to establish, before determination module 1002 determines at least one channel associated with a heartbeat channel, an association relationship between the heartbeat channel and the at least one data channel, where the heartbeat channel and the at least one data channel are communication channels independent of each other. Relationship establishing module 10012 can be configured to determine whether a current data channel carries a set identifier and to send address information of the heartbeat channel to the current data channel if the current data channel carries the set identifier to establish an association relationship between the current data channel and the heartbeat channel according to the address information.

In these embodiments, ending module 1008 can be configured to determine that the heartbeat times out if the master process does not receive, within a first preset time, a heartbeat message sent through the heartbeat channel and to re-schedule the current task through the master process. Ending module 1008 can also be configured to determine that the heartbeat times out if the worker process does not receive, within a second preset time, a heartbeat message sent through the heartbeat channel and to exit the worker process to end the current task executed in the worker process. The sum of the second preset time and an interval between sending heartbeat messages is less than the first preset time.

In these embodiments, disconnection module 1006 can be configured to update a state of the worker process to be a timeout state when it is detected that any data channel is in a disconnected state and to control the worker process to stop sending a heartbeat message to the master process so that the master process updates a state of the worker process stored in the master process to be a timeout state. Disconnection module 1006 can be configured to control the master process to stop sending a heartbeat message to the worker process when it is detected that any data channel is in a disconnected state so that a state of the worker process is updated to be a timeout state.

Detection module 1004 can be configured to determine according to a set detection message whether the data channel is in a disconnected state, where the set detection message is an empty data communication packet. Detection module 1002 can be configured to send the set detection message periodically in the data channel when it is detected that a data message in the data channel fails to be sent, to determine that the data channel is in the disconnected state if the set detection message continually fails to be sent in a first set time threshold, and if otherwise, to determine that the data channel is in a connected state.

In these embodiments, the data message in the data channel and the set detection message can be distributed and transmitted through different processes. The heartbeat channel can implement communication based on a User Datagram Protocol (UDP). A first heartbeat message reported by the worker process to the master process through the heartbeat channel includes a UDP heartbeat address of the worker process. The UDP heartbeat address is used to cause the master process to send a second heartbeat message to the worker process according to the UDP heartbeat address.

In summary, the system for processing a communication channel described in these embodiments implements a state association between a heartbeat channel and a data channel, so that when the data channel does not work, the heartbeat channel is disconnected accordingly, ensuring state consistency of the two channels. That is, when the data channel is abnormal, the communication channel is disconnected, so that both the data channel and the communication channel are in an abnormal state. Thus, a current task can be ended timely, avoiding the problem that the current task is shelved for a long time and continually fails to be executed and reducing the occupation of system resources.

Secondly, the heartbeat channel and the data channel are independent of each other. The heartbeat channel uses a simple UDP protocol to bear heartbeat communication, so that a heartbeat protocol is very simple. This minimizes both the network load caused by the communication and the processing logic of sending and receiving sides. Thus, the method for processing a communication channel described in these embodiments can be adapted to large-scale concurrent distributed applications. In addition, in these embodiments, multiple data channels are allowed to be associated with the same heartbeat channel, thus greatly improving the scalability of the system.

Some apparatus embodiments include functionality that is basically similar to the functionality provided in the method embodiments, so they can be described simply. For related parts, refer to the descriptions of the parts in the method embodiments.

The embodiments of this specification are all described in a progressive manner. Each embodiment emphasizes a difference from other embodiments. Identical or similar parts in the embodiments may be obtained with reference to each other.

It is understood that embodiments of the present disclosure may be provided as a method, an apparatus, or a computer program product. Therefore, the embodiments of the present disclosure may be implemented as a complete hardware embodiment, a complete software embodiment, or an embodiment combining software and hardware. Moreover, the embodiments of the present disclosure may be in the form of a computer program product implemented on one or more computer usable storage media (including, but not limited to, a magnetic disk memory, a CD-ROM, an optical memory, and the like) including computer usable program codes.

In a typical configuration, the computer device includes one or more processors (CPU), an input/output interface, a network interface, and a memory. The memory may include a volatile memory, a random access memory (RAM) and/or a non-volatile memory or the like in a computer readable medium, for example, a read-only memory (ROM) or a flash RAM. The memory is an example of the computer readable medium. The computer readable medium includes non-volatile and volatile media as well as movable and non-movable media, and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cloud storage, a cassette tape, a magnetic tape/magnetic disk storage or other magnetic storage devices, or any other non-transmission medium. The storage medium can be used to store information accessible to the computing device. According to the definition in this text, the computer readable medium does not include transitory media, such as modulated data signals and carriers. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

The embodiments of the present disclosure are described with reference to flowcharts and/or block diagrams according to the method, the terminal device (system) and the computer program product of the embodiments of the present disclosure. It is understood that a computer program instruction may be used to implement each process and/or block in the flowcharts and/or block diagrams and combinations of processes and/or blocks in the flowcharts and/or block diagrams. The computer program instructions may be provided to a universal computer, a dedicated computer, an embedded processor or a processor of another programmable data processing terminal device to generate a machine, such that the computer or the processor of another programmable data processing terminal device executes an instruction to generate an apparatus configured to implement functions designated in one or more processes in a flowchart and/or one or more blocks in a block diagram.

The computer program instructions may also be stored in a computer readable storage that can guide the computer or another programmable data processing terminal device to work in a specific manner, such that the instructions stored in the computer readable storage generates an article of manufacture including an instruction apparatus, and the instruction apparatus implements functions designated by one or more processes in a flowchart and/or one or more blocks in a block diagram.

The computer program instructions may also be loaded to the computer or another programmable data processing terminal device, such that a series of operation steps are executed on the computer or another programmable terminal device to generate a computer implemented processing. Therefore, the instructions executed in the computer or another programmable terminal device provide steps for implementing functions designated in one or more processes in a flowchart and/or one or more blocks in a block diagram.

Embodiments of the present disclosure have been described. However, once knowing basic creative concepts, those skilled in the art can make other variations and modifications to the embodiments. Therefore, the appended claims are intended to be explained as including the embodiments described herein and all variations and modifications falling within the scope of the present disclosure.

Finally, it is further noted that in this text, the relation terms such as first and second are merely used to distinguish one entity or operation from another entity or operation, and do not require or imply that the entities or operations have this actual relation or order. Moreover, the terms "include," "comprise" or other variations thereof are intended to cover a non-exclusive inclusion, so that a process, method, article or terminal device including a series of elements not only includes the elements, but also includes other elements not explicitly listed, including elements inherent to the process, method, article or terminal device. In the absence of more limitations, an element defined by "including a/an . . . " does not exclude that the process, method, article or terminal device including the element further has other identical elements.

A method for processing a communication channel and a system for processing a communication channel provided in the present disclosure are described in detail above, and the principles and implementations of the present disclosure are described by applying specific examples in this text. The above descriptions on the embodiments are merely used to help understand the present disclosure and core ideas thereof. Meanwhile, for those of ordinary skill in the art, there may be modifications to the specific implementations and scopes thereof according to the spirit of the present disclosure. Therefore, the content of the specification should not be construed as limiting the present disclosure.

The invention claimed is:

1. A method for processing a communication channel comprising a heartbeat channel and at least one data channel between a master process and a worker process, the method comprising:

establishing an association relationship between the heartbeat channel and the at least one data channel, wherein the heartbeat channel and the at least one data channel are communication channels independent of each other;

determining the at least one data channel associated with the heartbeat channel;

detecting the determined at least one data channel;

disconnecting the heartbeat channel in response to a detection that any data channel is in a disconnected state to cause a heartbeat to time out; and ending a current task in response to a determination that the heartbeat times out.

2. The method according to claim 1, wherein ending the current task comprises performing at least one of the following:

determining that the heartbeat times out in response to the master process not receiving, within a first preset time, a heartbeat message sent through the heartbeat channel, and re-scheduling the current task through the master process; and determining that the heartbeat times out in response to the worker process not receiving, within a second preset time, a heartbeat message sent through the heartbeat channel, and exiting the worker process to end the current task executed in the worker process.

3. The method according to claim 2, wherein a sum of the second preset time and an interval between sending heartbeat messages is less than the first preset time.

4. The method according to claim 1, wherein disconnecting the heartbeat channel comprises:
updating a state of the worker process to be in a timeout state in response to a detection that any data channel is in a disconnected state; and
controlling the worker process to stop sending a heartbeat message to the master process to cause the master process to update a state of the worker process stored in the master process to be in a timeout state.

5. The method according to claim 1, wherein disconnecting the heartbeat channel comprises:
controlling the master process to stop sending a heartbeat message to the worker process in response to a detection that any data channel is in a disconnected state to cause a state of the worker process to be updated to be in a timeout state.

6. The method according to claim 1, wherein detecting the determined at least one data channel comprises:
determining according to a set detection message whether any data channel is in a disconnected state, wherein the set detection message is in the form of an empty data communication packet.

7. The method according to claim 6, wherein determining whether any data channel is in a disconnected state comprises:
sending the set detection message periodically in a first data channel in response to a detection that a data message in the first data channel fails to be sent; and
determining that the first data channel is in the disconnected state in response to the set detection message continually failing to be sent in a first set time threshold, and determining that the first data channel is in a connected state in response to the set detection message not continually failing to be sent in the first set time threshold.

8. The method according to claim 7, further comprising:
setting a state machine corresponding to the first data channel from a connected state to an uncertain state in response to a detection that the data message in the first data channel fails to be sent; and
setting the state machine corresponding to the first data channel from the uncertain state to a disconnected state in response to the set detection message continually failing to be sent.

9. The method according to claim 7, wherein the data message in the first data channel and the set detection message are distributed and transmitted through different processes.

10. The method according to claim 1, wherein the heartbeat channel implements communication based on a User Datagram Protocol (UDP), wherein the communication includes a first heartbeat message reported by the worker process to the master process through the heartbeat channel, the first heartbeat message comprising a UDP heartbeat address of the worker process, and the UDP heartbeat address being used to cause the master process to send a second heartbeat message to the worker process according to the UDP heartbeat address.

11. The method according to claim 1, wherein establishing the association relationship comprises:
determining whether a current data channel carries a set identifier; and
sending address information of the heartbeat channel to the current data channel in response to a determination that the current data channel carries the set identifier to establish an association relationship between the current data channel and the heartbeat channel according to the address information.

12. A system for processing a communication channel comprising a heartbeat channel and at least one data channel between a master process and a worker process, the system comprising:
one or more memories configured to store instructions; and
one or more processors configured to execute the instructions to cause the system to perform:
establishing an association relationship between the heartbeat channel and the at least one data channel, wherein the heartbeat channel and the at least one data channel are communication channels independent of each other;
determining the at least one data channel associated with the heartbeat channel;
detecting the determined at least one data channel;
disconnecting the heartbeat channel in response to a detection that any data channel is in a disconnected state to cause a heartbeat to time out; and
ending a current task in response to a determination that the heartbeat times out.

13. The system according to claim 12, wherein the one or more processors are configured to execute the instructions to cause the system to perform at least one of the following:
determining that the heartbeat times out in response to the master process not receiving, within a first preset time, a heartbeat message sent through the heartbeat channel, and re-scheduling the current task through the master process; and
determining that the heartbeat times out in response to the worker process not receiving, within a second preset time, a heartbeat message sent through the heartbeat channel, and exiting the worker process to end the current task executed in the worker process.

14. The system according to claim 13, wherein a sum of the second preset time and an interval between sending heartbeat messages is less than the first preset time.

15. The system according to claim 12, wherein the one or more processors are configured to execute the instructions to cause the system to update a state of the worker process to be in a timeout state in response to a detection that any data channel is in a disconnected state, and controlling the worker process to stop sending a heartbeat message to the master process to cause the master process to update a state of the worker process stored in the master process to be in a timeout state.

16. The system according to claim 12, wherein the one or more processors are configured to execute the instructions to cause the system to control the master process to stop sending a heartbeat message to the worker process in response to a detection that any data channel is in a disconnected state to cause a state of the worker process to be updated to be in a timeout state.

17. The system according to claim 12, wherein the one or more processors are configured to execute the instructions to cause the system to determine according to a set detection message whether any data channel is in a disconnected state, wherein the set detection message is in the form of an empty data communication packet.

18. The system according to claim 17, wherein the one or more processors are configured to execute the instructions to cause the system to perform:

sending the set detection message periodically in a first data channel in response to a detection that a data message in the first data channel fails to be sent; and determining that the first data channel is in the disconnected state in response to the set detection message continually failing to be sent in a first set time threshold, and determining that the first data channel is in a connected state in response to the set detection message not continually failing to be sent in a first set time threshold.

19. A non-transitory computer-readable storage medium storing a set of instructions that is executable by one or more processors of one or more electronic devices to cause the one or more electronic devices to perform a method for processing a communication channel comprising a heartbeat channel and at least one data channel between a master process and a worker process, the method comprising:

establishing an association relationship between the heartbeat channel and the at least one data channel, wherein the heartbeat channel and the at least one data channel are communication channels independent of each other;

determining the at least one data channel associated with the heartbeat channel;

detecting the determined at least one data channel;

providing instructions to disconnect the heartbeat channel in response to a detection that any data channel is in a disconnected state to cause a heartbeat to time out; and providing instructions to end a current task in response to a determination that the heartbeat times out.

* * * * *